Figure 1:
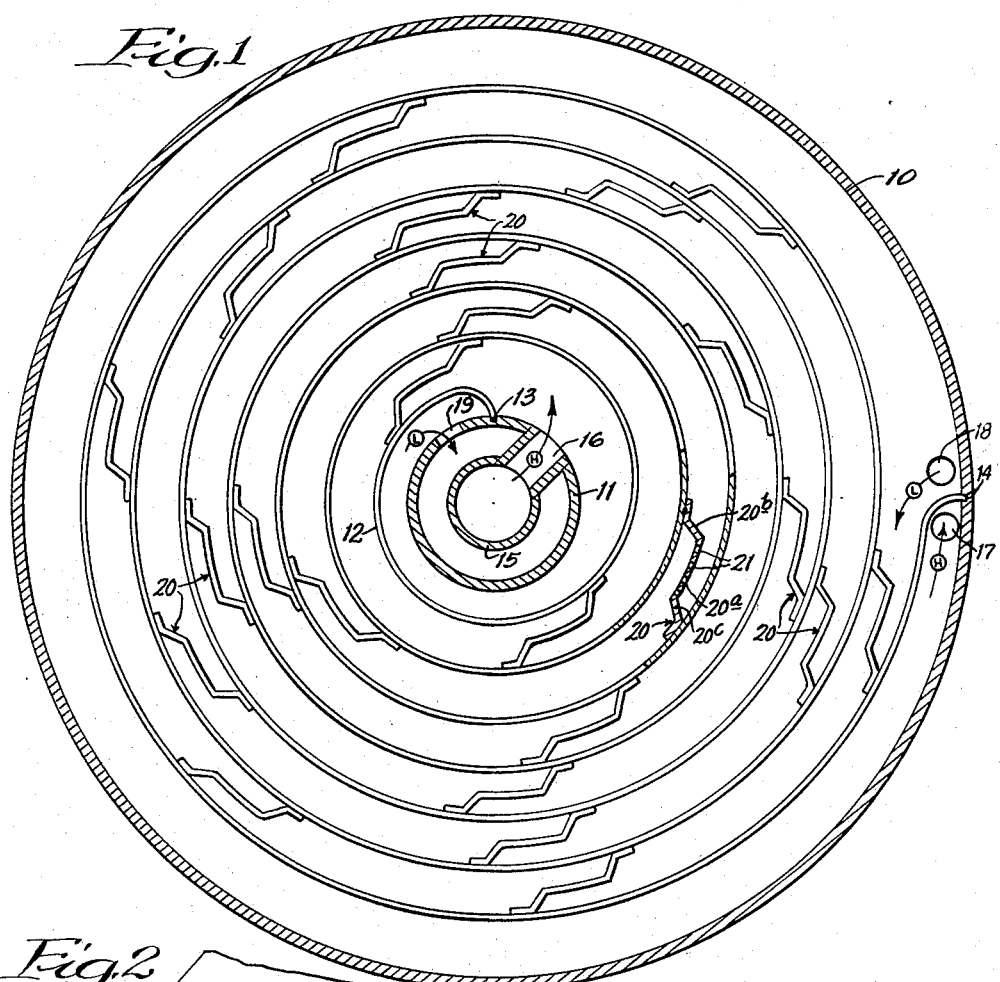

March 24, 1959 W. J. PODBIELNIAK 2,878,993
CENTRIFUGAL COUNTERCURRENT CONTACTING
METHOD AND APPARATUS
Filed July 5, 1955

INVENTOR:
Walter J. Podbielniak,
BY
Dawson, Tilton & Graham,
ATTORNEYS.

United States Patent Office 2,878,993
Patented Mar. 24, 1959

2,878,993

CENTRIFUGAL COUNTERCURRENT CONTACTING METHOD AND APPARATUS

Walter J. Podbielniak, Chicago, Ill., assignor of one-half to Wladzia G. Podbielniak Application July 5, 1955, Serial No. 519,710

5 Claims. (Cl. 233—15)

This invention relates to a centrifugal countercurrent contacting method and apparatus wherein different phases, including at least one liquid phase, are brought into contact for various purposes. The invention is particularly concerned with the centrifugal countercurrent contacting of immiscible liquids of different densities.

The centrifugal countercurrent contacting of immiscible liquids and other multi-phase systems has been practiced commercially for a number of years. One apparatus employed for this purpose consists of a hollow casing mounted for rotation on a shaft, the casing containing a plurality of axially-concentric rings or drums which are each perforated around the entire circumference thereof. The heavy phase, usually a liquid which may or may not contain solid material, is introduced at the central portion of the contactor while the contactor is being rotated at high speed. By the centrifugal force thus generated, the heavy liquid is impelled outwardly, flowing from ring to ring through the perforations therein. The light phase, either liquid, gaseous, or both, is simultaneously introduced into the outer portion of the contactor under sufficient pressure to cause it to flow countercurrently to the heavy phase through the ring perforations. While this countercurrent radial flow of the two phases predominates, there is also some circumferential flow in the spaces between the rings, although this circumferential flow is necessarily somewhat haphazard and irregular. When the light phase reaches the central portion of the contactor, it is continually removed at a reduced pressure.

While the contacting method and apparatus just described give remarkable results from many standpoints, they have been found to have definite limitations. Specifically, it has not been found possible to increase the efficiency and/or capacity of such contacting devices beyond certain limits, which limits are lower than would be desirable for many applications.

The contacting efficiency of extractors and similar equipment is usually discussed in terms of the number of theoretical stages provided by the particular apparatus. From a theoretical standpoint, it can be shown that not more than one stage can be provided by each of the concentric rings on present commercial centrifugal contactors. Actually, the practical limit is near one stage for each two rings, and in some cases as many as four rings may be required to provide the equivalent of one theoretical contact stage. Since certain minimum clearances must be maintained between the adjacent concentric rings of the centrifugal contactor, it can be seen that increasing the number of stages requires a corresponding increase in the diameter of the contactor. On the other hand, the maximum permissible diameter of the contactor is severely limited by the required rotational speed for maximum efficiency. With rotational speeds of 2,000 to 5,000 r.p.m., centrifugal forces up to several thousand times gravity are generated at the outer peripheral portion of the contactor and forces of this magnitude impose a great strain on the material from which the contactor is formed. Thus, after a certain maximum size is reached, which is usually in the range of about 3 to 5 feet in diameter, the operating speed of the contactor must be reduced for reasons of safety, but this in turn offsets the advantage of increased diameter.

For the reasons just outlined, about 15 actual stages have been considered to be the practical design limit of present centrifugal contacting devices. An objective, however, of 20 or more actual stages has been considered by designers of such equipment. In this connection, designers have particularly deplored the relatively inefficient utilization of the contacting spaces between the outer concentric rings, as compared with the spaces between the inner rings. Although the centrifugal forces are much higher in the outer spaces and there is much more total space between two outer rings than two inner rings, it has still not been possible to achieve the equivalent of more than one theoretical stage within the total space between any two of the outer rings.

A related problem is that of increasing the capacity of the centrifugal contactor, especially since it is desired to obtain an increase in capacity without an increase in overall size. With any given contactor, however, the maximum capacity for good contacting efficiency will vary considerably depending on the type and relative proportions of the heavy and light phases. Where both of the phases are liquid and one phase is present in a much smaller volume than the other, the smaller volume liquid may tend to short circuit or channel. This prevents adequate contacting of the two phases. Another type of difficulty occurs when one of the liquid phases tends to emulsify in the other, and this difficulty is especially acute with large differences in the volume ratios. Still another difficulty may occur when one of the liquid phases contains solid material, which may materially reduce contacting efficiency and/or lead to channelling by plugging up the ring perforations.

It is therefore a general object of this invention to provide a centrifugal countercurrent contacting method and apparatus which tends to overcome the problems and limitations discussed above. A more specific object is to provide a centrifugal contacting apparatus and method of contacting liquids of different densities, as well as other types of relatively light and heavy phases, which permits the contacting efficiency to be increased substantially over a present commercial unit of the same diameter. Still another object is to provide a contacting passageway design which can be incorporated in a centrifugal contacting apparatus to give both increased efficiency and increased capacity. Another related object is to provide for an increase in contactor capacity for a given diameter of contactor by improving the internal construction of the contactor and without increasing its overall size. Further objects and advantages will become apparent as the specification proceeds.

This invention is shown in an illustrative embodiment in the accompanying drawing, in which—

Figure 2:
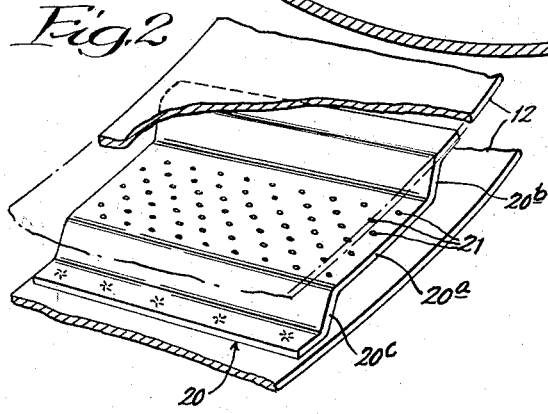

Fig. 1 is a somewhat schematic cross-sectional view of a rotor embodying the present invention and adapted for use in a centrifugal contacting apparatus; and Fig. 2, a perspective view of one of the spot mixing elements.

Looking first at Fig. 1 of the drawing, there is shown in cross-section a rotor of a counter-current contact apparatus that embodies the principles of the present invention. Specifically, the illustrated rotor includes an outer casing 10 which is mounted on a hollow rotatably supported shaft 11, as is well known in the art. Around shaft 11 and supported between the end portions of casing 10, there is provided a continuous spirally-wound ribbon or band 12, the inner end of band 12 being secured at 13 to shaft 11 and its outer end to casing 10 at 14. The turns of band 12 may also be secured at their edges to the side walls of the rotor (not shown). Preferably, as shown, the turns of band 12 are approximately equidistant, although this is not essential. In any event, the turns should provide therebetween a continuous spiral passageway from the inner to the outer portion of the contactor. Also, it is preferred that band 12 should be imperforate so that the continuous spiral passageway has imperforate walls, thereby directing the flowing phases along a continuous spiral path, whether the particular phase is flowing outwardly or inwardly. Reference is made to my prior Patent 2,109,375 as disclosing further constructional detail of rotors having spiral passageways of the kind just described.

With the construction illustrated, the heavy liquid or phase is supplied through a centrally positioned conduit 15 within shaft 11, which is connected to the inner portion of the contactor and communicates therewith at 16. The heavy liquid outlet is located at the outermost part of the spiral path provided by hand 12, and is illustrated diagrammatically as an outlet port 17. Similarly, an inlet port 18 is shown in the outer portion of the spiral passageway for admitting the light liquid or phase of lesser density than the one introduced at the center of the contactor. The light phase is shown as being removed through an outlet port 19 into the annular passageway provided between shaft 11 and its inner conduit portion 15. It will be understood that the specific construction of the inlet and outlet means for both the light and heavy phases can be varied considerably, and in fact the inlet and outlet means form no part of the present invention. Furthermore, suitable constructions for introducing and removing the phases to be contacted are well known in the art, and should not require further discussion herein. In this connection reference is again made to my prior Patent 2,109,375 and also to my prior Patent 2,670,132.

To achieve the results of this invention, it is important to provide within the spiral passageway between the turns of band 12, a plurality of flow-interrupting mixing means disposed across the spiral passageway at spaced intervals along the turns thereof, and to have the passageway substantially uninterrupted between these mixing means. In the illustration given, there is shown a plurality of spaced baffles 20 which include means for forming one or both of the counter-currently flowing phases into radially-extending jets. For example, the central portion 20a of each of the baffles is provided with a plurality of perforations 21, which are constructed and arranged so that liquids flowing therethrough under pressure will be formed into jets. For best results, it has been found desirable to have perforations 21 substantially radially or non-spirally oriented. This can be done conveniently, as illustrated, by having the central portion 20a of each baffle 20 spirally-aligned and lying generally parallel to the adjacent walls of the spiral passageway within which it is located, and forming perforations 21 approximately at right angles to the plane of central portion 20a. Of course, this construction can be varied considerably without departing from the basic idea of the design. Also, it is preferable to dimension baffles 20 to extend entirely across the width of band 12, although some of the advantages of this invention can be obtained with baffles of narrower widths.

As shown in Figs. 1 and 2 baffles 20 are imperforate except for the perforations 21 in central portion 20a. More specifically, the end or wing portions 20b and 20c of the baffles have no perforations, and merely act to deflect the liquids towards perforations 21. With this construction, both of the phases must flow through the perforations 21 in opposite directions, and thereby a spot mixing of the phases occurs on both sides of the baffles. Some additional mixing may also occur within the perforations 21. As a result of the mixing action adjacent baffles 20, the phases are dispersed in each other so as to increase the area of contact. As the dispersed mixture of each phase flows toward the next baffle, the centrifugal forces acting thereon tend to cause the heavier phase to collect on the outer wall of the passageway and the lighter phase to collect on the inner wall thereof. This action, combined with the spot mixing action, achieves an alternating sequency of positive mixing and clarification, the mixing zones being adjacent baffles 20 and the clarifications zones being in the open spaces between the baffles.

With the construction just described, more than one contact stage can be provided per turn of the spiral, the theoretical limit being one stage for each spot mixing baffle and intervening clarification space. This means that the number of stages per turn can increase proportionately with the length of the turn, so that the outer turns of the spiral can provide more stages per turn than the inner turns of the spiral. As shown in Fig. 1, the baffles 20 are equally spaced apart, and thereby the number of baffles per turn varies from one baffle per turn at the center of the spiral to around five or six baffles in the outermost turn of the spiral. This construction also has the advantage of being inherently solids handling, and of permitting easy cleaning by flushing the continuous spiral passageway.

For simplicity of construction, the angular baffles can be rigidly attached to only one of the walls of the spiral passageway. For example, as shown in Fig. 2, the outwardly extending margin of outer end portion 20c is spot-welded to the outer spiral wall, but the other end portion 20b is physically unattached to the inner spiral wall.

To provide for final clarification of both the light and heavy phases, as is well known in the art, it is desirable to introduce the heavy phase outwardly of the point of removal of the light phase. For the same reason, the heavy phase should be removed outwardly of the point of introduction of the light phase. In the illustration given, the heavy phase is introduced at 16, which is inwardly along the spiral passageway from the point of removal of the light phase at 19. Likewise, the point of removal of the heavy phase at 17 is outwardly along the spiral passageway from the point of introduction of the light phase at 18.

While in the foregoing specification this invention has been described in relation to specific embodiments thereof, and many details of these embodiments have been given, it will be apparent to those skilled in the art that the invention is susceptible to other embodiments and that many of the details described herein can be varied widely without departing from the basic concepts of the invention.

I claim:

1. In a rotor for a counter-current contact apparatus including a continuous spiral passageway having imperforate walls, a plurality of flow-interrupting mixing means disposed across said spiral passageway at spaced intervals along the turns thereof, said passageway being substantially uninterrupted between said mixing means.

2. The rotor of claim 1 in which said mixing means comprises baffles disposed across said passageway, said baffles providing a plurality of radially-aligned perforations extending therethrough.

3. In a rotor for a counter-current contact apparatus including a continuous spiral passageway having imperforate walls, a plurality of angular baffles disposed across said spiral passageway at spaced intervals along the turns thereof, said baffles having central portions aligned with the adjacent walls of said passageways and said central portions having a plurality of axially-aligned perforations extending therethrough, the spaces between said baffles along said passageway being open and uninterrupted.

4. The rotor of claim 3 in which said baffles extend between the adjacent walls of said passageway, and in which said baffles are imperforate except for the said perforations in the central portions thereof.

5. In a rotor for a counter-current contact apparatus which rotor provides therein a continuous spiral passageway having imperforate walls, at least one flow-interrupting means disposed across said spiral passageway at an intermediate position therealong, said passageway being substantially uninterrupted for a substantial distance on each side of said flow-interrupting means.

References Cited in the file of this patent

UNITED STATES PATENTS

| | | |
|---|---|---|
| 2,209,577 | Podbielniak | July 30, 1940 |
| 2,670,132 | Podbielniak | Feb. 23, 1954 |
| 2,758,783 | Podbielniak | Aug. 14, 1956 |